F. W. HORTON.
LIQUID SUPPLY FOR MOTOR VEHICLE COOLING SYSTEMS.
APPLICATION FILED MAY 1, 1914.
1,202,844.
Patented Oct. 31, 1916.
3 SHEETS—SHEET 1.
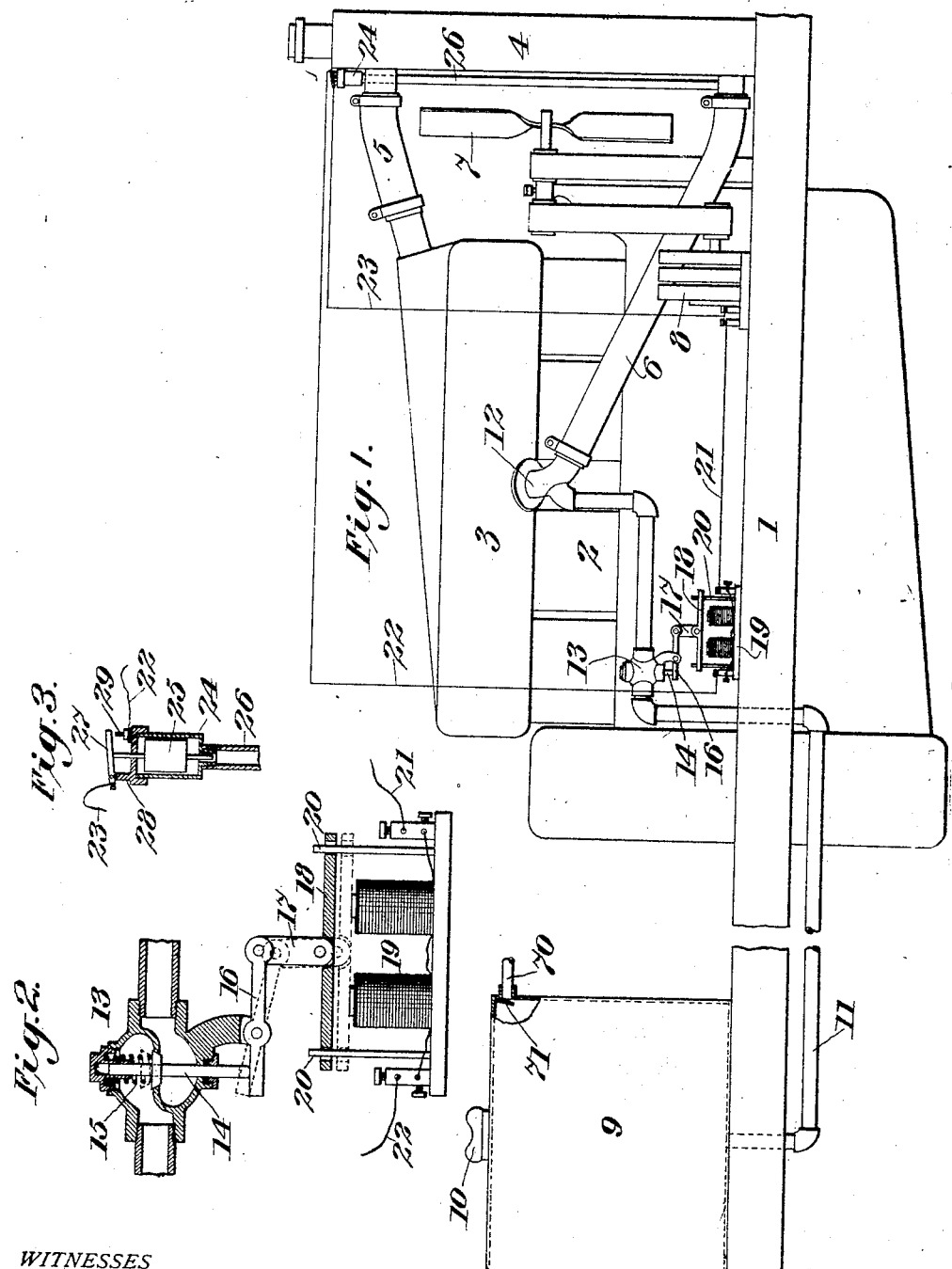
WITNESSES
INVENTOR
Frederick W. Horton
by Wm. H. Finckel
Atty.

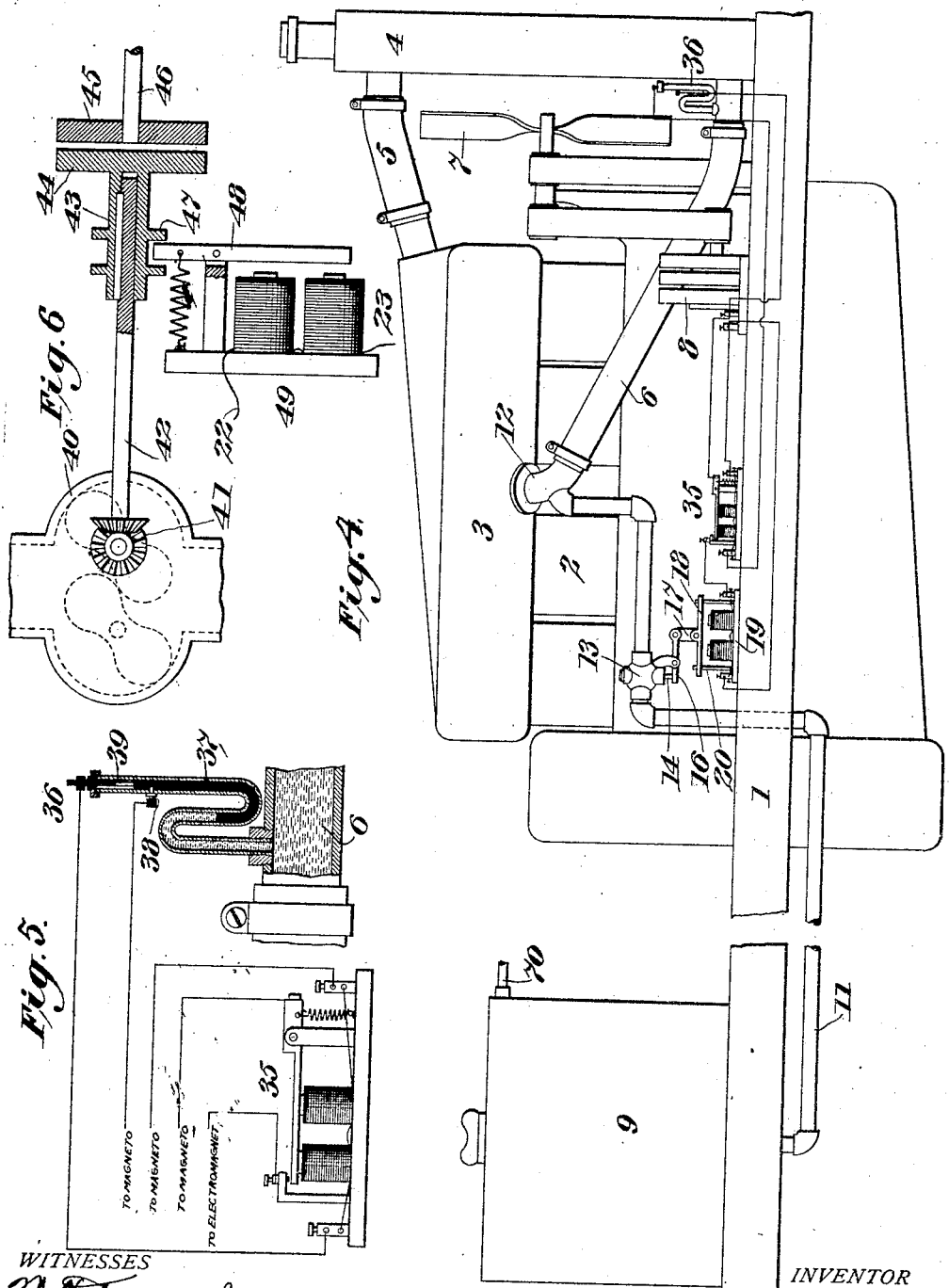

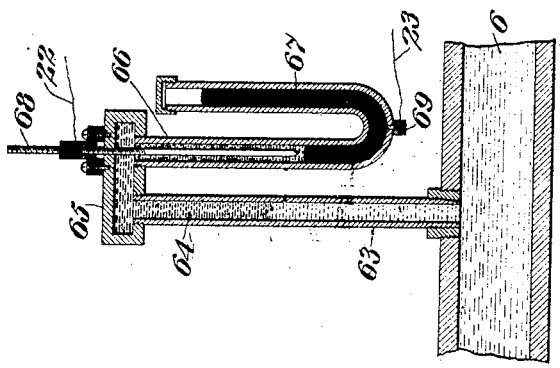
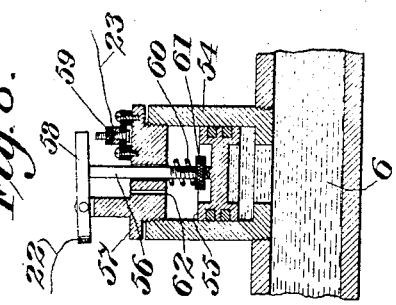
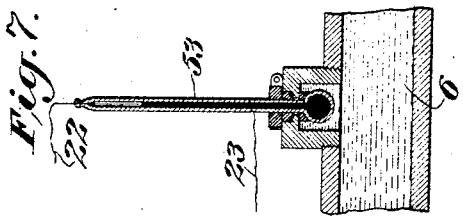

UNITED STATES PATENT OFFICE.

FREDERICK W. HORTON, OF DENVER, COLORADO.

LIQUID-SUPPLY FOR MOTOR-VEHICLE COOLING SYSTEMS.

1,202,844.  Specification of Letters Patent.  Patented Oct. 31, 1916.

Application filed May 1, 1914. Serial No. 835,706.

*To all whom it may concern:*

Be it known that I, FREDERICK W. HORTON, a citizen of the United States, residing at Denver, in the county of Denver and State of Colorado, have invented a certain new and useful Improvement in Liquid-Supplies for Motor-Vehicle Cooling Systems, of which the following is a full, clear, and exact description.

The object of this invention is to provide an auxiliary reservoir for containing a cooling agent for use in cooling the engines used on various kinds or types of self-propelled carriers or conveyances, such as automobiles, motor vehicles, trucks and the like, and especially those using internal combustion engines, and the specific object of the invention is to provide on the vehicle of whatever kind, a reservoir adapted to supply water to the cooling system, as, for example, the water jacket and radiator, as these parts are commonly used in motor vehicles, so that the necessity for stopping the vehicle for replenishing the cooling medium in the cooling system is minimized and the radius of travel on the supply of cooling medium carried is greatly enlarged.

As an illustration of the invention, and without thereby meaning to limit its scope and adaptability, the invention comprises an independent reservoir or other receptacle mounted upon and carried by the self-propelled vehicle or other transportation medium, in which the cooling agent may be stored for use as needed, and this receptacle connected with the cooling system of the motor and its adjuncts, such as the engine and the radiator, in such way that the supply of cooling agent in the cooling system may be periodically replenished, without requiring stopping of the vehicle, such replenishing from the reservoir being effected by any of a variety of means, some of which are herein shown and described; it being understood that the independent reservoir is in purpose and effect a reserve supply for the cooling system and is not exposed to reflux from the cooling system, as I will proceed now more particularly to explain and finally claim.

In the accompanying drawings illustrating the invention, in the several figures of which like parts are similarly designated, Figure 1 shows in side elevation the invention applied to a typical automobile motor, with an automatic arrangement for replenishing the cooling agent in those parts requiring a cooling medium. Fig. 2 is a vertical section illustrating a part of the automatic valve mechanism. Fig. 3 is a vertical section illustrating part of the automatic supply control mechanism. Fig. 4 is a side elevation of the motor mechanism of a typical automobile, illustrating another form of automatic supply mechanism. Fig. 5 is a sectional elevation and diagram illustrating part of the controlling mechanism of Fig. 4. Fig. 6 is a sectional view illustrating a pumping arrangement for controlling the flow of the cooling agent, in substitution for the valve. Figs. 7, 8 and 9 are sectional elevations of three several forms of automatic control mechanism.

As already indicated, the invention is not limited, excepting as hereinafter specifically claimed, to any particular means for operating the valve or for controlling the operation of the valve, and what is herein shown and described in this behalf is intended as illustrations, the main feature and gist of the invention being the provision on the vehicle or other carrier or conveyance itself, as hereinafter claimed, of means for replenishing the supply of cooling medium for the motor, the circulation, if any, of the cooling agent being quite independent of the replenishing means.

Explaining the invention as applied to an automobile, 1 may represent a portion of the chassis; 2 a part of the engine which is here represented as an internal combustion engine; 3 the water jacket applied to the engine, and 4 the radiator. 5 and 6 are pipes connecting the water jacket at different points with the upper and lower portions of the radiator. 7 is the ordinary fan arrangement located between the engine and the radiator. 8 is a magneto or other source of electricity. All of these parts may be of any ordinary or approved construction.

Located somewhere on the chassis, or car, or vehicle, is a tank or reservoir 9 of any suitable material, construction and capacity, adapted to be filled in any suitable way, as through a stoppered opening 10, with a cooling agent, such as water. From this tank extends an outlet pipe 11 which extends to the cooling system of the motor; and for this purpose said pipe may enter the water jacket at any suitable point, as for example, through the union 12 which forms a part of the pipe 6. In whatever way the outlet pipe 11 is connected to the cooling system, it is necessary in accordance with one form of my invention to interpose in it a valve 13, of any approved construction, by means of which the flow of the water or other cooling agent from the reservoir to the cooling system may be controlled. As shown in detail in Fig. 2, this valve 13 may be of the ordinary globe-valve type, the stem 14 of the valve projecting out of the valve shell and the valve disk being seated by a spring 15. Various means may be used for operating this valve.

Referring now to Figs. 1 and 2, an electro-magnetic apparatus is made a part of the installation for opening the valve, and this apparatus is automatically actuated by means of a circuit closer rendered operative upon variations in the quantity of water in the cooling system. The electro-magnetic apparatus herein shown comprises a lever 16 pivoted below the valve stem and adapted to be moved so as to lift the stem and thereby unseat the valve against the pressure of the spring 15, so as to permit a flow of water from the reservoir through the pipe 11 and into the cooling system. This lever 16 is shown connected by a link 17 with an armature 18 of an electro-magnet 19. The armature preferably is mounted upon guide rods 20. The electro-magnet is connected in circuit with the magneto 8 by the wires 21, 22 and 23, through a circuit closer 24 of any suitable construction. As shown in Figs. 1 and 3 this circuit closer is a float 25 arranged upon a pipe 26 which extends upwardly from the lower pipe 6 and is in open communication with said pipe 6, although it might be otherwise connected with the cooling system. This float 25 acts upon a contact piece 27 which is pivoted upon a cap piece 28 for the float container. Said cap piece is provided with a contact piece or binding post 29 to which one terminal of the wire 22 is fixed, and one terminal of the wire 23 is applied to the contact piece 27, so that upon the dropping of the float due to the lowering of the level of the cooling agent in the pipe 26 and its connected parts to or beyond a predetermined point, the contact piece 27 will make contact with the post 29 and thus close the circuit between the magneto and the electro-magnet, causing the energizing of the electro-magnet and the attraction of the armature 18 so as to operate the lever 16 and open the valve 13 for the replenishing of the supply of cooling agent in the cooling system; and when the normal level of the water has been reached, the float 25 will be lifted and raise the contact piece 27 so as to break the circuit and thus permit the valve 13 to close by action of its spring and cut off the supply of cooling agent. Thus the cooling system is replenished automatically with the cooling agent as may be needed.

It will be understood, of course, that the cooling system may be filled in the first instance independently of the reserve supply contained in the tank 9, and this reserve supply only be drawn upon as the supply in the cooling system is depleted.

Referring to Fig. 4, the electro-magnet for operating the valve may be as previously described, but I may place in the circuit an electro-magnetic circuit closer 35 which is wired to the electro-magnet and to the magneto or other source of electrical energy, substantially as indicated, and this circuit closer may be connected with the liquid level circuit breaker 36 shown in detail in Fig. 5, comprising a bent tube containing a mobile quantity of mercury or other electrical conductor 37 which is actuated by the water level in the cooling system to make and break the circuit between the terminals 38 and 39 of the conductors leading respectively to the magneto and the electro-magnetic circuit closer 35.

The operation of this arrangement would seem to be obvious, but to state it briefly, it is to be noted that when the water in the cooling system falls to or below a predetermined level, the circuit is broken between the terminals 38 and 39, and this breaks the circuit in the circuit closer 35, whereupon the circuit in the electro-magnet is closed and the valve opened to replenish the supply of cooling agent from the reservoir 9; and when the cooling agent has again risen to the proper level, the operations just described are reversed and the devices 35 and 36 restored to their previous condition until the level again falls.

Various other expedients may be adopted for controlling the flow of fluid from the tank, or reservoir 9, some of which will now be described. Referring to Fig. 6, 40 may indicate a pump of any suitable construction interposed in the supply pipe 8 at a convenient point and connected by gearing 41 with a shaft 42 keyed or otherwise applied to the sleeve 43 of a slidable disk 44 which is arranged parallel with the disk 45 on a shaft 46 which may be driven from the motor or engine. The sleeve 43 has a clutch member 47 which is engaged by a lever clutch member 48 adapted to be operated by an electro-magnet or other operating agent 49 so as to throw the disk 44 into frictional contact with the disk 45, whereby the disk 44 and sleeve 43 are rotated and through them the shaft 42 is rotated which by its gears 41 rotates the pump to draw a supply of cooling agent from the tank or reservoir into the cooling system. The actuating device 49 may be rendered operative in any suitable way by the falling of the cooling agent in the cooling system below a predetermined level, as in the instance previously described. So also various substitutes for the circuit closers at the radiator may be employed. As shown for example in Fig. 7, I may use a thermal circuit closer 53 here illustrated as located in the lower portion of the pipe 6 adjacent to the radiator, but which might be otherwise located so long as it is rendered operative by an undue rise in temperature of the water in the cooling system to close the circuit containing the electro-magnetic valve actuating device and cause the opening of the valve and a replenishing of the supply of cooling agent.

As shown in Fig. 8, I may introduce in the system, as for example on the pipe 6 near the radiator, a cylinder 54 containing a fluid-tight piston 55 having a stem 56 extending up out of the cap 57 and acting against a contact arm 58 with which one of the terminals of the electric installation shown in Fig. 1 may be connected, the other terminal being connected with a binding post and contact piece 59. When the pressure in the cooling system is normal, the piston 55 is raised in the cylinder 54 sufficiently to lift the contact piece 58 out of contact with the post 59 and break the circuit, but when the pressure falls below normal, the piston will descend and such descent may be accentuated by the provision of a spring 60. The tension of the spring 60 may be adjusted by means of the nut 61 on the stem 56. Air above the piston may escape through the vent 62 in the cap 57. A diaphragm might be used instead of the piston in a similar arrangement.

As shown in Fig. 9, I may introduce in the system, as, for example, upon the pipe 6, an upright pipe 63 in which the cooling agent rises to a certain height and above this is supported a mobile body 64 of any suitable fluid, such as oil, or gas, which is a non-conductor of electricity, and the pipe 63 opens into a head 65 from which depends an inverted gooseneck 66, this non-conducting material extending also into the head and part way down into the gooseneck, the remainder of the gooseneck being supplied with any suitable mobile conductor 67. The terminals may be a rod 68 extending down into one limb of the gooseneck and a binding post 69 at the bend in the gooseneck, and these terminals are suitably connected in electrical circuit with the valve-operating medium so that upon the falling of the cooling agent in the cooling system to or below a predetermined level, the mobile portions in the apparatus will move so as to make the circuit and cause the valve to open and permit a supply of cooling agent to flow from the tank 9 into the cooling system.

The flow of the cooling agent from the tank 9 may be effected by gravity, or force or pressure may be used for this purpose, or as an aid to gravity. As shown in Fig. 1, the tank may have a pipe 70 opening into its upper portion and supplied with a check valve 71 to prevent reflux, and this pipe may conduct pressure from any source into the tank above its contents of cooling agent. Such pressure may be air or gas or the exhaust from the motor, or any other pressure agent obtained from any suitable source, which may be a part of the motor or vehicle or an auxiliary or added element.

The main feature of the invention is the provision in an apparatus of the character described of a reserve supply of cooling agent to replenish the cooling agent in the cooling system as such cooling agent becomes deficient in quantity, or excessive in temperature in such system, and this quite irrespective of the means for rendering the reserve supply effective.

What I claim is:—

1. The combination with a motor and a cooling system therefor, of a reservoir having a one-way connection with the cooling system and adapted to contain a reserve supply of cooling agent, a valve interposed in such connection, a valve actuating device, and an electric circuit including said valve actuating device and a circuit closer actuated by differences in level in the cooling system of the cooling agent to open and close the circuit and thereby render the valve actuating device operative.

2. The combination of a motor, a cooling system therefor, a circuit closer connected with the cooling system and operating responsively to variations in level of the cooling agent in said cooling system, a reservoir connected with the cooling system and containing a reserve supply of cooling agent, and means interposed between the circuit closer and the reservoir and rendered operative by said circuit closer to periodically open communication between said reservoir and said cooling system.

3. The combination with a motor and a cooling system therefor, of a support for these parts, and a receptacle erected upon said support apart from the motor and its cooling system, a pipe connecting the receptacle with the cooling system, a valve interposed in said pipe, and an electric circuit including a solenoid connected with said valve and a circuit closer connected with said cooling system and automatically operating to open the valve when the cooling agent in the cooling system drops below a predetermined level and operating to close the valve when the predetermined level is again established.

4. The combination with a motor and a cooling system therefor, of a support for these parts, and a receptacle erected upon said support apart from the motor and its cooling system, a pipe connecting the receptacle with the cooling system, a valve interposed in said pipe, and an electric circuit including said valve and cooling system and automatically energized by variations in level of the cooling agent in the cooling system to open and close the valve.

5. The combination with a motor and a cooling system therefor, of a reservoir having a one-way connection with the cooling system and adapted to contain a reserve supply of cooling agent, a valve interposed in the one-way connection aforesaid, the said cooling system including a radiator, an electro-magnetic operating medium for such valve, and means rendered active by exposure to variations in height of the column of cooling agent in said radiator to energize the electro-magnet.

6. The combination with a motor and a cooling system therefor, of a reservoir having a one-way connection with the cooling system and adapted to contain a reserve supply of cooling agent, a valve interposed in the one-way connection aforesaid, an electro-magnetic operating medium for such valve, means rendered active by exposure to variations in height of the column of cooling agent in said cooling system, and an electro-magnetic instrument interposed between said means and the electro-magnetic valve operating medium to energize the last to effect the opening and closing of the valve.

In testimony whereof I have hereunto set my hand this 28th day of April, A. D. 1914.

FREDERICK W. HORTON.

Witnesses:
  ANDREW A. H. HAMILTON,
  EDITH G. MATHISON.